(12) United States Patent
Uehara

(10) Patent No.: US 8,855,978 B2
(45) Date of Patent: Oct. 7, 2014

(54) METHOD FOR SIMULATING MAGNETIC MATERIAL

(75) Inventor: Yuji Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/610,291

(22) Filed: Sep. 11, 2012

(65) Prior Publication Data

US 2013/0006593 A1   Jan. 3, 2013

Related U.S. Application Data

(63) Continuation of application No. PCT/JP2010/054692, filed on Mar. 18, 2010.

(51) Int. Cl.
| | | |
|---|---|---|
| *G06F 17/10* | (2006.01) | |
| *G06F 17/50* | (2006.01) | |
| *G01R 33/00* | (2006.01) | |
| *G01R 33/12* | (2006.01) | |

(52) U.S. Cl.
CPC ........ *G01R 33/1215* (2013.01); *G06F 2217/16* (2013.01); *Y02T 10/82* (2013.01); *G06F 17/5018* (2013.01); *G01R 33/0064* (2013.01)
USPC .......................................................... 703/2

(58) Field of Classification Search
USPC .......................................................... 703/2
See application file for complete search history.

(56) References Cited

U.S. PATENT DOCUMENTS

| | | | |
|---|---|---|---|
| 7,058,527 B2 * | 6/2006 | Shimizu ......................... | 702/66 |
| 7,236,899 B1 | 6/2007 | Shimizu | |
| 2003/0083832 A1 | 5/2003 | Takano | |
| 2005/0075818 A1 | 4/2005 | Shimizu | |

FOREIGN PATENT DOCUMENTS

| | | |
|---|---|---|
| JP | 2003-30805 | 1/2003 |
| JP | 2005-83764 | 3/2005 |
| JP | 2005-100067 | 4/2005 |
| JP | 2007-213384 | 8/2007 |
| JP | 2008-120089 | 5/2008 |

OTHER PUBLICATIONS

Fidler et al.:Micromagnetic modelling and magnetization processes; Journal of Magnetism and Magnetic Materials 272-276 (2004) 641-646.*

Matsuo et al.: A micromagnetic study of domain structure modeling; Journal of Magnetism and Magnetic Materials 320 (2008) e1029-e1033.*

(Continued)

*Primary Examiner* — Hugh Jones
(74) *Attorney, Agent, or Firm* — Staas & Halsey LLP

(57) ABSTRACT

A method for simulating a magnetic material includes: repeatedly performing a first process and a second process until the change of magnetization and a static magnetic field converges, the first process being to calculate a distribution of the magnetization and an average magnetization in a magnetic material model of micromagnetics, and the second process being to assign the magnetic material model of the micromagnetics to each mesh included in another magnetic material model, calculate the static magnetic field of the another magnetic material model using the calculated average magnetization, and return the calculated static magnetic field to the calculation of the distribution of the magnetization; generating a hysteresis loop of each mesh included in the another magnetic material model based on the calculated average magnetization and the calculated static magnetic field, and calculating a hysteresis loss of the another magnetic material model from an area of the generated hysteresis loop.

8 Claims, 11 Drawing Sheets

(56) References Cited

OTHER PUBLICATIONS

Jin et al..; Quasi-Analytical Calculation of Thermal Magnetization Fluctuation Noise in Giant Magnetoresistive Sensors; Ieee Transactions on Magnetics, vol. 40, No. 3, May 2004; pp. 1712-1722.*

R. Hu et al. Micromagnetic modeling studies on the effects of stress on magnetization reversal and dynamic hysteresis; Journal of Magnetism and Magnetic Materials 301 (2006) 458-468.*

Tetsuji Matsuo et al, "Demagnetizing Field in Micromagnetic Simulation under Periodic Boundary Conditions", IEEE Transactions of Magnetics, vol. 47, No. 5, May 2011, pp. 902-905.

Katsumi Yamazaki et al., "Iron Loss and Magnet Eddy Current Loss Analysis of IPM Motors with Concentrated Windings", IEEJ Trans. IA, vol. 128, No. 5, 2008, pp. 678-684.

International Search Report of Corresponding PCT Application PCT/JP2010/054692 mailed Apr. 20, 2010.

Tetsuji Matsuo et al, "A Study of Demagnetizing Field in Micromagnetic Simulation under Periodic Boundary Condition", IEE Japan, Jan. 28, 2010, pp. 87-91.

H. Akimoto et al., "Optimum Layer Structure of Antiferromagnetic-Coupled Multilayer for SPT Perpendicular Writer Heads", Advance Head Technology Department, Fujitsu Ltd., Apr. 1, 2005, vol. 29, No. 4, pp. 423-426, 510.

Jian-Gang Zhu, "Micromagnetics of Thin-Film Media", Department of Electrical Engineering, University of Minnesota, pp. 1-4, 1995.

K. Takano, "Simulation of Magnetic Recording Heads by Parallel Micromagnetic Finite Element Method", NII-Electronic Library Service, Headway Technologies, Jun. 1, 2005, vol. 29, No. 6, pp. 608-614, 692.

"Development of General-Purpose Micro-Magnetization Analysis Simulator", May 2004, vol. 55, No. 3, pp. 238-245.

Oriano Bottauscio et al., "Critical Aspects in Micromagnetic Computation of Hysteresis Loops of Nanometer Particles", IEEE Transactions on Magnetics, Istituto Nazionale di Ricerca Mertologica, vol. 45, No. 11, Nov. 2009, pp. 1-5.

Tetsuji Matsuo et al., "A Study of Micromagnetic Simulation on Grid", Kyoto University, Jul. 31, 2006, pp. 7-12.

William Fuller Brown, Jr., "Thermal Fluctuations of a Single-Domain Particle", Department of Electronics, Weismann Institute of Science, Jan. 21, 1963, vol. 130, No. 5, pp. 1677-1686.

Tetsuji Matsuo et al., "Representation of minor hysteresis loops of a silicon steel sheet using stop and play models", Graduate School of Engineering, Kyoto University, 2006, pp. 25-29.

Japanese Office Action Mailed on Jul. 23, 2013 in corresponding Japanese Patent Application No. 2012-505397, 4 pages.

Kouchi Shimizu et al., "Development of General-Purpose Micro-Magnetization Analysis Simulator", Fujitsu, May 10, 2004, vol. 55, No. 3, p. 238-245.

Tetsuji Matsuo et al., "A Study of Micromagnetic Simulation on Grid", IPSJ SIG Technical Report, Aug. 2, 2006, vol. 2006, No. 87, p. 7-12.

Japanese Office Action mailed Feb. 25, 2014 in corresponding Japanese Application No. 2012-505397, 4 pages.

* cited by examiner

MAGNETIC MATERIAL
MODEL OF FINITE
ELEMENT METHOD

MAGNETIC MATERIAL
MODEL OF
MICROMAGNETICS

SITUATION OF MAGNETIZATION IN
ACTUAL MAGNETIC MATERIAL

CALCULATION OF
MAGNETIZED STATE

METHOD FOR SIMULATING MAGNETIC MATERIAL

CROSS-REFERENCE TO RELATED APPLICATIONS

This application is a continuation application of International Application PCT/JP2010/054692 filed on Mar. 18, 2010 and designated the U.S., the entire contents of which are incorporated herein by reference.

FIELD

A certain aspect of the embodiments is related to a method for simulating a magnetic material, and a non-transitory computer readable medium.

BACKGROUND

The simulation of electric equipment using a magnetic material, such as a motor and a power generator, is widely performed in various scenes by the improvement in performance of a computer and the progress of a method for analyzing an electromagnetic field. A difference method and a finite element method are generally used as the method for analyzing the electromagnetic field. In recent years, the efficiency of the electric equipment is emphasized greatly as an approach to CO2 reduction or prevention of global warming, so that the expectation for the simulation is growing further.

The electric loss of the electric equipment using the magnetic material includes a copper loss caused by a coil (an eddy current loss caused by a coil), a classic eddy current loss caused by the magnetic material, a hysteresis loss resulting from the hysteresis of the magnetic material, and an abnormal eddy current loss. In order to calculate the efficiency of the electric equipment, it is necessary to obtain such a loss correctly. By the progress of the technology of driving the electric equipment in recent years, the case where a high-frequency magnetic field (e.g. a magnetic field of KHz order) is applied to the magnetic material increases, compared with the past. In such a situation, the loss in the magnetic material tends to increase and the exact estimate of the loss in the magnetic material becomes an important item for optimization of the structure and the material of the electric equipment.

In the finite element method employed by the simulation of the electric equipment, a magnetic material model is a simple model which defines only a relationship between a magnetic permeability and a magnetic flux density, as illustrated in FIG. 1. Consequently, the magnetic material model of FIG. 1 cannot express a hysteresis curve of the magnetic material, so that there is a problem that the hysteresis loss and the abnormal eddy current loss which occur in the magnetic material are uncomputable.

For such a problem, a method for calculating the hysteresis loss and the abnormal eddy current loss by the formulas decided analytically is employed in the present simulation. For example, according to Non-patent Document 1 ("Katsumi Yamazaki, Yousuke Isoda, "Iron Loss and Magnet Eddy Current Loss Analysis of IPM Motors with Concentrates Windings", IEEJ (Institute of Electrical Engineers of Japan) Trans. 1A, Vol. 128, No. 5, 2008"), the hysteresis loss $W_h$ and the abnormal eddy current loss $W_e$ when the high-frequency magnetic field is applied to the magnetic material model are calculated by the following analysis formulas (1) and (2), respectively. In this method, since "$K_h$" and "$K_e$" in the formulas are factors calculated from catalog data of the magnetic material, the factors are different from values in an actual operating state of the electric equipment, and hence it is difficult to exactly calculate the hysteresis loss and the abnormal eddy current loss.

$$W_h = \sum_n \left\{ \int_{iron} K_h D(nf)^2 (B_{r,n}^2 + B_{\theta,n}^2) dv \right\} \quad (1)$$

$$W_e = \sum_n \left\{ \int_{iron} K_e D(nf)^2 (B_{r,n}^2 + B_{\theta,n}^2) dv \right\} \quad (2)$$

Although Non-patent Document 2 ("Tetsuji Matsuo, Yasushi Terada, Masaaki Shimasaki, "Representation of minor hysteresis loops of a silicon steel sheet using stop and play models", http://www.sciencedirect.com, Physica B, Volume 372, Issues 1-2, 1 Feb. 2006, Pages 25-29") studies the calculation of a hysteresis loop of the magnetic material by an analytical method called "Stop and Play Models", the method has not been used for actual analysis yet.

There is known a calculation method by micromagnetics of Non-patent Document 3 ("William Fuller Brown, Jr., "Thermal Fluctuations of a Single-Domain Particle", Physical Review, Volume 130, Number 5, 1 Jun. 1963") as a simulation method treating the magnetic domain structure and the magnetic domain wall of the magnetic material. Although Non-patent Document 4 ("Tetsuji Matsuo, Yuya Yamazaki, Takeshi Iwashita, "A Study of Demagnetizing Field in Micromagnetic Simulation under Periodic Boundary Condition", The Papers of Technical Meeting, IEE Japan, MAG-10-17, SA10-17, RM10-17, January 2010") studies the hysteresis loop of the micromagnetics, the hysteresis loop is not applied to actual analysis.

SUMMARY

According to an aspect of the present invention, there is provided a method for simulating a magnetic material performed by a computer, including: repeatedly performing by a processor a first process and a second process until the change of magnetization and a static magnetic field converges, the first process being to calculate a distribution of the magnetization and an average magnetization in a magnetic material model of micromagnetics, and the second process being to assign the magnetic material model of the micromagnetics to each mesh included in another magnetic material model, calculate the static magnetic field of the another magnetic material model using the average magnetization calculated by the first process, and return the calculated static magnetic field to the calculation of the distribution of the magnetization; generating by the processor a hysteresis loop of each mesh included in the another magnetic material model based on the average magnetization calculated by the first process and the static magnetic field calculated by the second process, and calculating by the processor a hysteresis loss of the another magnetic material model from an area of the generated hysteresis loop.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of embodiments of the invention, with reference to drawings.

Figure 1:
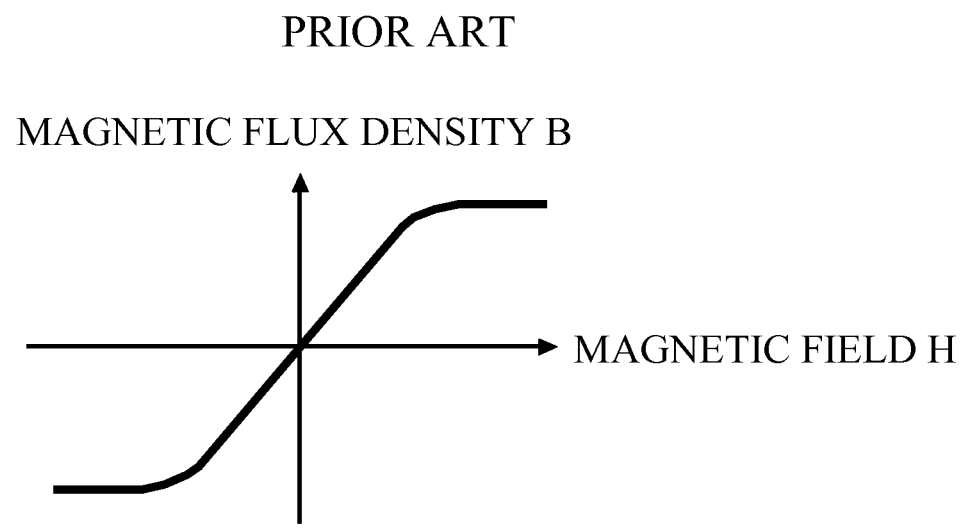
FIG. 1 is a diagram illustrating an example of a conventional magnetic material model.
Figure 2A:
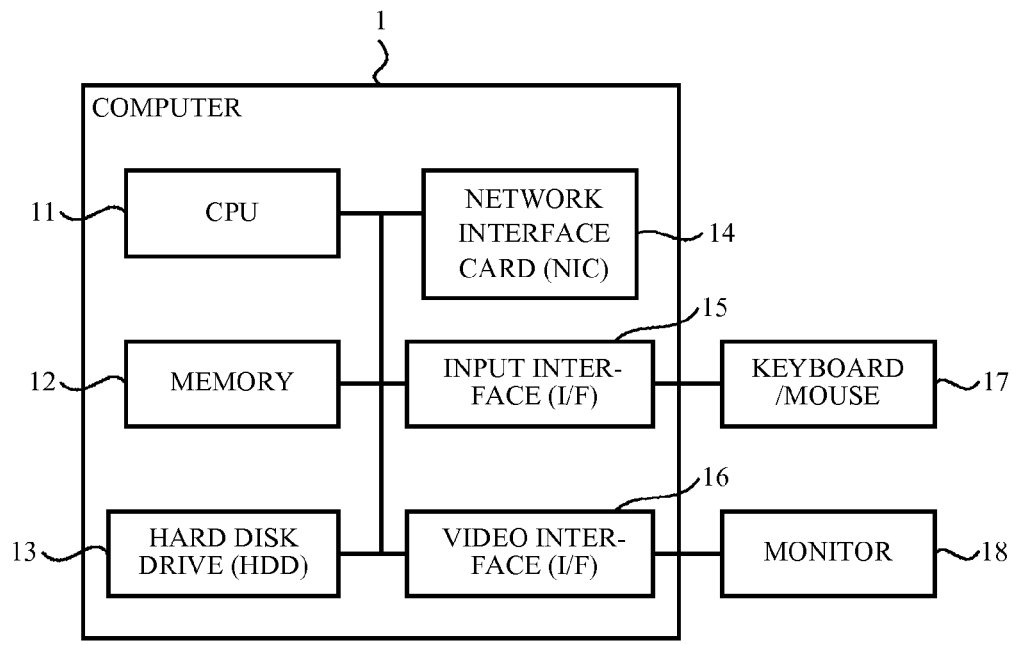
FIG. 2A is a block diagram illustrating the configuration of an information processing apparatus according to a present embodiment.
Figure 2B:
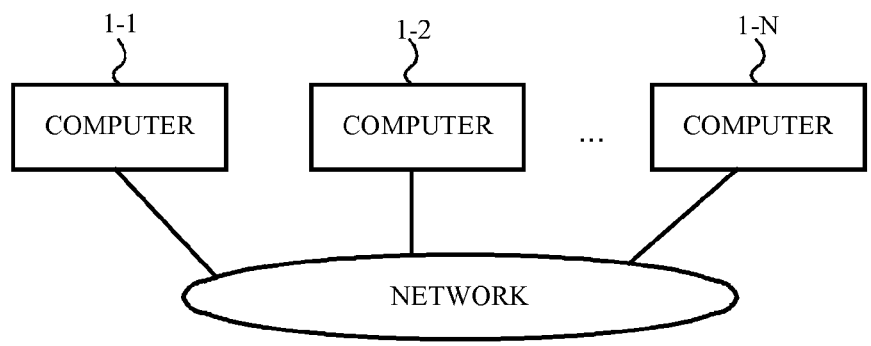
FIG. 2B is a diagram illustrating an example of a parallel computer including a plurality of information processing apparatuses of FIG. 2A.

FIG. 2A is a block diagram illustrating the configuration of an information processing apparatus according to a present embodiment. FIG. 2B is a diagram illustrating an example of a parallel computer including a plurality of information processing apparatuses of FIG. 2A;

The information processing apparatus of FIG. 2A is a computer 1 such as a server. The computer 1 includes: a CPU (Central Processing Unit) 11 that controls the whole operation of the computer 1; a memory 12 that functions as a working area; a hard disk drive (HDD) 13 including an OS (Operating System) and a simulation program; a network interface card (NIC) 14; an input interface (I/F) 15; and a video interface (I/F) 16. The CPU 11 is connected to the memory 12, the HDD 13, the NIC 14, the input I/F 15; and the video I/F 16. A keyboard and mouse 17 is connected to the input I/F 15. A monitor 18 is connected to the video I/F 16. The CPU 11 reads out and performs the simulation program stored into the HDD 13 to perform simulation of micromagnetics and a finite element method as described later. It is assumed that data on a magnetic material model used for the micromagnetics and the finite element method is stored into the HDD 13 beforehand.

The simulation of the micromagnetics and the finite element method may be performed by a single computer, as illustrated in FIG. 2A, and the simulation may be performed by a plurality of computers 1-1 to 1-N (N: a natural number more than or equal to 2), i.e., a parallel computer, as illustrated in FIG. 2B. When the parallel computer performs the simulation of the micromagnetics and the finite element method, time required for the simulation is reduced.

A description will be given of the calculation method of the micromagnetics, and then the features of the present embodiment.

In the micromagnetics, magnetic energy in the magnetic material is expressed by anisotropy energy $E_{ani}$, magnetostatic energy $E_{mag}$, exchange interaction energy $E_{exc}$, and Zeeman energy $E_{ext}$ of the following equations (3) to (7).

$$E_{ani} = K\lfloor 1 - (k_i \cdot m_i)^2 \rfloor \; i = 1, 2, \ldots, N \tag{3}$$

$$E_{mag} = -M_i \cdot \left[ \sum_{j \neq i} D_{ij} \cdot M_j + \frac{1}{2} D_{ij} \cdot M_j \right] i = 1, 2, \ldots, N \tag{4}$$

$$D_{ij} = \frac{1}{v_i} \int_{v_i} dr^3 \int_{s_j} dr'^2 \frac{(r-r')\hat{n}'}{|r-r'|^3} \tag{5}$$

$$E_{exc} = -\frac{2A^*}{M^2 a^2} M_i \cdot \sum_{n,n} M_j, \; i = 1, 2, \ldots, N \tag{6}$$

$$E_{ext} = -H_{app} \cdot M_i, \; i = 1, 2, \ldots, N \tag{7}$$

Wherein "K" represents a magnetic anisotropy factor, "k" represents a unit vector in an axis direction of easy magnetization, "m" represents a unit vector in a direction of magnetization, "M" represents saturation magnetization of each mesh, "$D_{ij}$" represents a demagnetizing factor determined from a geometric shape of a mesh, "r" represents a position vector of the i-th mesh, "r'" represents a position vector of the j-th mesh, "$A^*$" represents a stiffness constant, "a" represents a distance between meshes, "$H_{app}$" represents an externally-applied magnetic field, and "N" represents the number of meshes.

Total magnetic energy $E_{tot}$ in the magnetic material is expressed by the total of the anisotropy energy $E_{ani}$, the magnetostatic energy $E_{mag}$, the exchange interaction energy $E_{exc}$ and the Zeeman energy $E_{ext}$, as illustrated in an equation (8).

$$E_{tot}(r_i) = E_{ani}(r_i) + E_{mag}(r_i) + E_{exc}(r_i) + E_{ext}(r_i) \tag{8}$$

An effective magnetic field $H_i$ is defined by the differentiation of these energies, as illustrated in an equation (9).

$$\begin{aligned} H_i &= -\frac{\partial E_{tot}(r_i)}{\partial M_i} \\ &= -\frac{\partial E_{ani}(r_i)}{\partial M_i} - \frac{\partial E_{mag}(r_i)}{\partial M_i} - \\ &\quad \frac{\partial E_{exc}(r_i)}{\partial M_i} - \frac{\partial E_{ext}(r_i)}{\partial M_i}. \end{aligned} \tag{9}$$

The equation (9) is standardized by a magnetic anisotropy $H_k (= 2 K/M)$ to obtain an equation (10).

$$h_i = \frac{H_i}{H_k} = (k_i \cdot m_i)k_i + h_m \sum_{j=1}^{N} D_{ij} \cdot m_j + h_e \sum_{n,n} m_j + h_a \tag{10}$$

Wherein $h_m$ and $h_e$ are a magnetostatic field factor and an exchange interaction factor standardized by the magnetic anisotropy $H_k$, respectively, as illustrated in equations (11) and (12). The "$h_a$" is an externally-applied magnetic field $H_{app}/H_k$ standardized by the magnetic anisotropy $H_k$.

$$h_m = \frac{M}{H_k} \quad (11)$$

$$h_e = \frac{A^*}{Ka^2} \quad (12)$$

The movement of magnetization in the magnetic material is determined by Landau-Lifshitz-Gilbert equation (i.e., LLG equation) illustrated in an equation (13).

$$\frac{dm_i}{dt} = m_i \times h_i - \alpha m_i \times (m_i \times h_i), i = 1, 2, \ldots, N \quad (13)$$

Wherein α is a damping constant. A first term of the right-hand side of the equation (13) is a precession movement term, and a second term is a dumping term. In order to obtain a magnetized state in the magnetic material, the simulation program divides the magnetic material into small meshes, and calculates the movement of magnetization by applying the equation (13) to magnetization $m_i$ of each mesh. While carrying out a precession movement, the magnetization is converged on a minimum value (i.e., local minimal value) of energy with progress of time due to the dumping term. By using the calculation method of the micromagnetics, it is possible to calculate the magnetized state in the magnetic material, i.e., the magnetic domain structure and the magnetic domain wall.

The hysteresis loss and the abnormal eddy current loss are losses greatly concerned with the magnetic domain wall motion in the magnetic material, and the magnetic domain wall motion needs to be calculated in order to obtain them by the simulation. However, in order to calculate the magnetic domain wall, it is necessary to use very small meshes having about 10 nm size, and hence it is impossible to directly apply the calculation method of the micromagnetics to large electric equipment, such as a motor.

Therefore, in the present embodiment, the simulation program reproduces the hysteresis loop of an electrical steel or the like to be used for the electric equipment, to the magnetic material model, by the calculation method of the micromagnetics.

In the micromagnetics, the standardized effective magnetic field $h_i$ is provided with the terms based on some magnetic energies, as illustrated in the equation (10), and can express dynamic or static magnetic property of the magnetic material by the $h_m$ and the $h_e$. For example, Non-patent Document 5 (Jian-Gang Zhu, "Micromagnetics of thin-film media", p. 5.2, McGROW-HIL1995) discloses that the hysteresis loops of various hard magnetic materials can be expressed by using the $h_m$ and the $h_e$ as parameters in the hard magnetic materials (permanent magnet material and so on). These parameters are really studied in a field in which materials with such a physical property can be manufactured.

Also in the present embodiment, although the same method as Non-patent Document 5 was applied to soft magnetic material which is the material of the electrical steel, it became clear that a hysteresis loop cannot be reproduced by the method of Non-patent Document 5 when the physical property of the soft magnetic material was used. This is because, when anisotropy energy $E_{ani}$ of the soft magnetic material is compared with that of the hard magnetic material, the former is one a few thousandths smaller than the latter, the $h_m$ becomes about $10^4$ large value, and each particle (i.e., each mesh) is greatly affected by the magnetostatic energy from adjacent particles (i.e., meshes).

Then, in the present embodiment, since the applicant gave priority to reproducing a hysteresis loop, he tried to reduce the $h_m$ and the $h_e$. By applying such conditions, not only a major loop of the hysteresis but a minor loop thereof can be reproduced. However, reducing the $h_m$ corresponds to reducing a saturation magnetic flux density that is the physical property of the soft magnetic material, and a problem that cannot obtain the magnetostatic energy (i.e., the static magnetic field) correctly occurs.

To solve the problem, the applicant has solved the problem caused by reducing the saturation magnetic flux density of the soft magnetic material, by calculating the static magnetic field with a calculation routine different from the calculation of the hysteresis loop. If the above-mentioned calculation routine is a method that can calculate the static magnetic field, the calculation routine can apply to any method. For example, it is considered that the above-mentioned calculation routine is a method generally used for the engineering calculation, such as the finite element method or the difference method. The static magnetic field calculation in the finite element method or the difference method is performed by using an equation (14) derived from the Maxwell equation which is a primitive equation of electromagnetism.

$$rot(vrotA) = J_0 - \sigma\frac{\partial A}{\partial t} - \sigma grad\phi, \quad (14)$$

Wherein "A" represents a magnetic vector potential, "$J_0$" represents a current, "σ" represents an electric conductivity, and "φ" represents a scalar potential. When the magnetic flux density is set as "B (B=μH+M)", the magnetic vector potential "A" is defined as "B=rot (A)". "μ" represents a magnetic permeability, and "M" represents magnetization.

In the present embodiment, since the simulation program focuses attention on reproducing the hysteresis loop to the magnetic material model of the soft magnetism material, the simulation program produces a state where each mesh included in the magnetic material model causes rotation and reversal independently by the optimization of the magnetostatic field factor $h_m$ and the exchange interaction factor $h_e$, and expresses the hysteresis loop. The simulation program calculates the hysteresis loop by using the magnetic material model having 100 or more meshes. Although the magnetic material model needs to be prepared for each mesh included in a magnetic material model of the finite element method calculating the static magnetic field, a total number of meshes in the micromagnetics is enough with 100בthe number of meshes included in the magnetic material of the finite element method". Thus, since the total number of meshes in the micromagnetics does not become huge, the simulation program can fully be run and is a calculation method with a little communication between CPUs, so that the simulation program is suitable as an application of the parallel computer.

Next, a description will be given of the calculation method of the static magnetic field of each mesh included in the magnetic material model of the finite element method using the simulation program.

First, the magnetic material model of the micromagnetics for calculation of the hysteresis is prepared for each mesh included in the magnetic material model of the finite element method. Then, the simulation program applies the external magnetic field (e.g. a magnetic field H(t) which occurs by a current flowing through a coil if the motor is used) to the magnetic material model of the micromagnetics, and calculates the magnetized state of the magnetic material model of the micromagnetics by the calculation method of the micromagnetics. The simulation program calculates the static magnetic field using the result of the magnetized state and the finite element method, applies the result of the calculated static magnetic field to the magnetic material model of the micromagnetics again, and calculates the magnetized state of the magnetic material model of the micromagnetics. Thus, the simulation program repeats the calculation of the magnetized state of the magnetic material model of the micromagnetics and the calculation of the static magnetic field using the finite element method in a loop system.

In the calculation of the magnetized state of the magnetic material model of the micromagnetics, the simulation program determines that the calculation has converged when the amount of change of the magnetization becomes smaller than a standard value, and sets forward time t by $\Delta t$. Until the simulation program applies the external magnetic field H(t) of one cycle or several cycles to the magnetic material model of the micromagnetics, the simulation program repeats the calculation of the magnetized state of the magnetic material model of the micromagnetics and the calculation of the static magnetic field using the finite element method in a loop system.

Finally, the simulation program calculates the hysteresis loss by obtaining an area drawn by the hysteresis loop (including the major loop and the minor loop) in each mesh included in the magnetic material model of the finite element method. In addition, the simulation program calculates the abnormal eddy current loss by associating a total amount of magnetization of meshes which are included in the magnetic material model of the micromagnetics and are reversed during time $\Delta t$, with magnetization reversal by the magnetic domain wall motion. By adopting such a calculation method, it is possible to perform the simulation of the hysteresis loss and the abnormal eddy current loss of the electric equipment more correctly than a conventional method.

Embodiment 1

A description will be given of a first embodiments, with reference to drawings.

Figure 3:
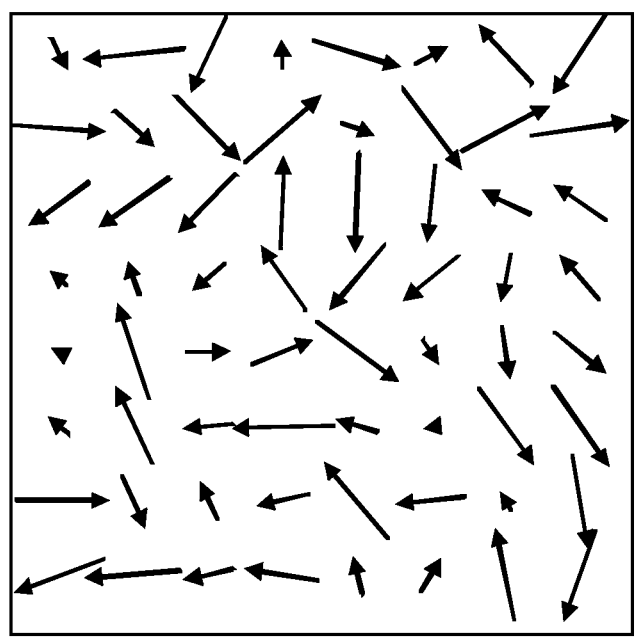
FIG. 3 is a diagram illustrating a calculation result of magnetization vectors in a magnetic material model calculated by a calculation method of micromagnetics.

FIG. 3 is a diagram illustrating a calculation result of magnetization vectors in the magnetic material model calculated by the calculation method of the micromagnetics. This is a result in which the simulation program has calculated the above-mentioned equations (10) and (13) by giving three-dimensional random magnetic anisotropy to the magnetic material model divided into 8×8×8 (i.e., calculation area). As the conditions of the calculation, the uniaxial magnetic anisotropy $H_k$ is set to 80 A/m, and the magnetostatic field factor $h_m$ and the exchange interaction factor $h_e$ are set to 0.1 and 0, respectively. As illustrated in FIG. 3, the magnetization of each mesh included in the magnetic material model is random without receiving influence of the adjacent meshes greatly.

Figure 4:
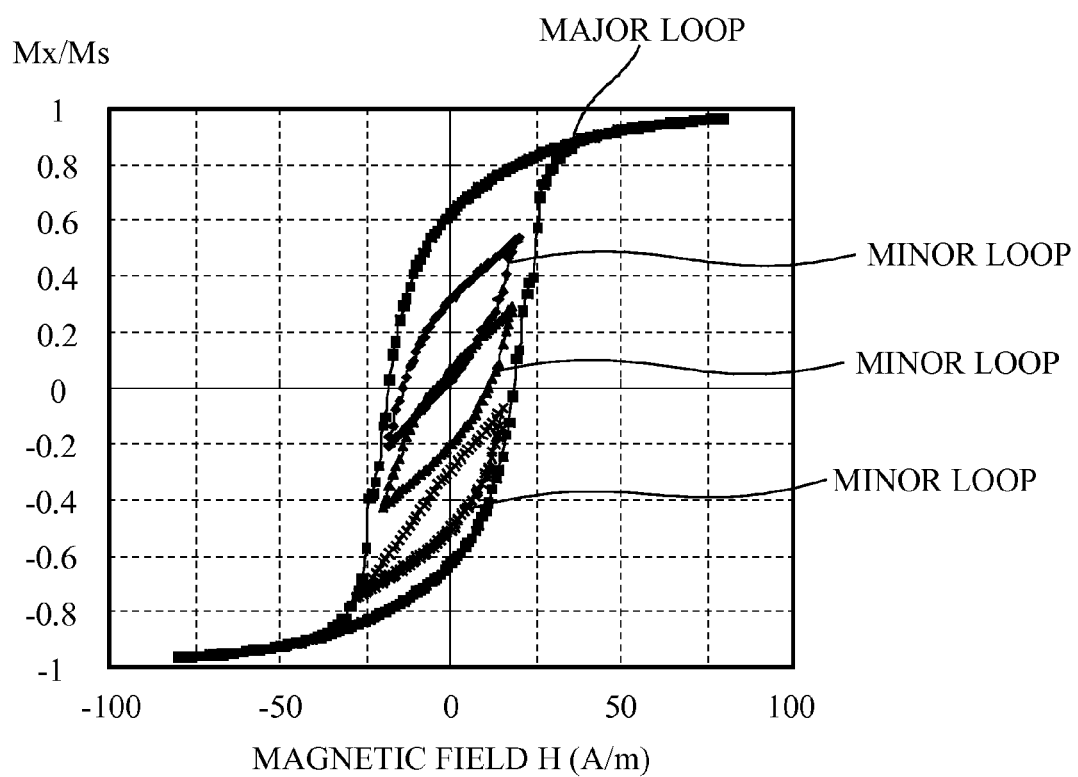
FIG. 4 is a diagram illustrating a calculation result of a hysteresis loop when a simulation program applies an external magnetic field to the magnetic material model.

FIG. 4 illustrates a calculation result of the hysteresis loop when the simulation program applies the external magnetic field to the magnetic material model. In FIG. 4, a loop when ±80 A/m magnetic field is applied to the magnetic material model is a major loop, and the other loops are minor loops. By using the magnetic material model, it is possible to express not only the major loop in the hysteresis loop but also the minor loops. Here, $M_x/M_s$ of the vertical axis in FIG. 4 is a variable obtained by standardizing a average value $M_x$ of the magnetization by a saturation magnetization $M_s$.

Figure 5:
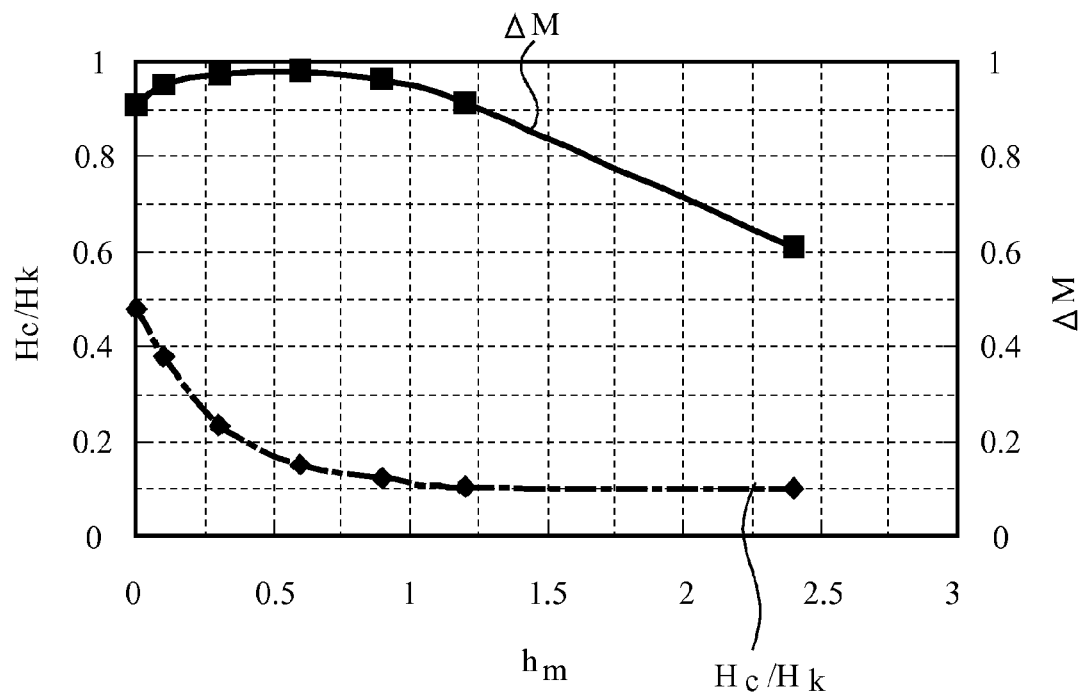
FIG. 5 is a diagram illustrating a relationship between a magnetostatic field factor $H_m$, a ratio of a coercivity $H_c$ to a magnetic anisotropy $H_k$ ($H_c/H_k$), and an index $\Delta M$ indicating the saturation of magnetization.
Figure 6:
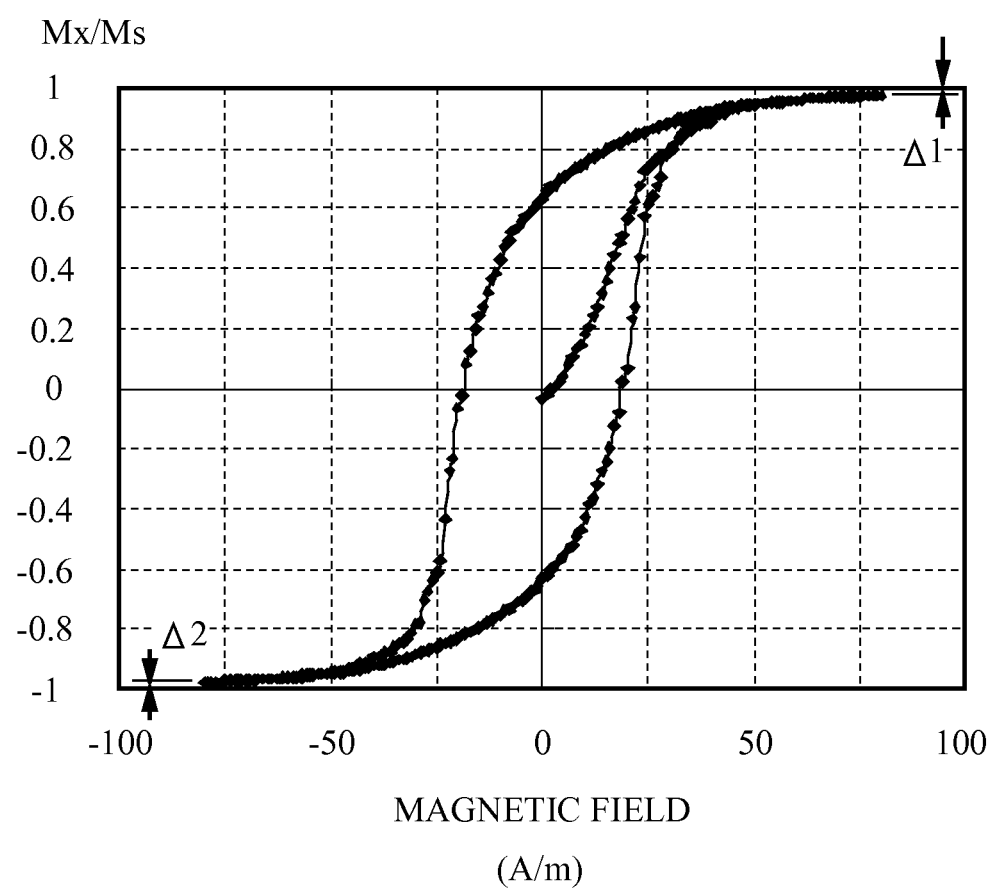
FIG. 6 is a diagram illustrating a calculation method of the index $\Delta M$ indicating the saturation of magnetization.

FIG. 5 is a diagram illustrating a relationship between the magnetostatic field factor $h_m$, a ratio of a coercivity $H_c$ to the magnetic anisotropy $H_k$ ($H_c/H_k$), and an index $\Delta M$ indicating the saturation of magnetization. In FIG. 5, the applicant has changed the value of the $h_m$ and has calculated the hysteresis loop with the simulation program. In FIG. 5, a horizontal axis is the magnetostatic field factor $h_m$ and a vertical axis is the ratio of the coercivity $H_c$ to the magnetic anisotropy $H_k$ ($H_c/H_k$) and the index $\Delta M$ indicating the saturation of magnetization. The $\Delta M$ is a value defined by "$1-(\Delta 1+\Delta 2)/2$" based on $\Delta 1$ and $\Delta 2$ in FIG. 6, and is used as an index indicating the saturation of magnetization. In FIG. 5, the values of "$H_c/H_k$" and "$\Delta M$" when a magnetic field with a same value as the magnetic anisotropy $H_k$ as an applied magnetic field is applied to the magnetic material model are plotted. The $\Delta M$ becomes a maximum when the magnetostatic field factor $h_m$ is about 0.5, and then the $\Delta M$ decreases. When the magnetostatic field factor $h_m$ increases, the interaction between adjacent particles strengthens. In addition, even if the magnetic field is applied to the magnetization, it is difficult for the magnetization to turn to the direction of the magnetic field, and hence the reproduction of the hysteresis loop, especially the minor loop, becomes difficult. Therefore, to reproduce the hysteresis loop, the magnetostatic field factor $h_m$ has to be a small value, and it is desirable that the $\Delta M$ is more than or equal to 0.9. This corresponds to a range of 0 to 1.25 of the magnetostatic field factor $h_m$. When the value of the magnetostatic field factor $h_m$ enters into the range of 0 to 1.25, and the hysteresis curve is reproduced, it is possible to apply the calculation method of the micromagnetics to the electric equipment utilizing the magnetic material with a large size.

Although in the present embodiment, the exchange interaction factor $h_e$ is set to 0, it is possible to fit a value acquired in the simulation by using the exchange interaction factor $h_e$ to an actual measurement value. In addition, it is possible to fit a value acquired in the simulation by using magnetic energy by a stress magnetostriction effect or the like to an actual measurement value. Moreover, it is possible to carry out fitting to an actual measurement value by also giving a distribution to the value of the uniaxial magnetic anisotropy $H_k$ itself.

In the present embodiment, the magnetic anisotropy has three-dimensional and random distribution, and hence the almost same hysteresis loop as FIG. 4 is obtained even if a direction of the applied magnetic field is changed. In the case of the magnetic material model with the magnetic anisotropy, the simulation program can express the magnetic anisotropy by giving the component of the magnetic anisotropy which changes with directions to the magnetic material model. Although the magnetic anisotropy has a three-dimensional and random distribution in the present embodiment, it is possible to perform the same calculation of the micromagnetics as described above even if the magnetic anisotropy has a two-dimensional and random distribution.

Next, a description will be given of an example of calculating the hysteresis loss by combining the calculation methods of the micromagnetics and the finite element method.

Figure 7:
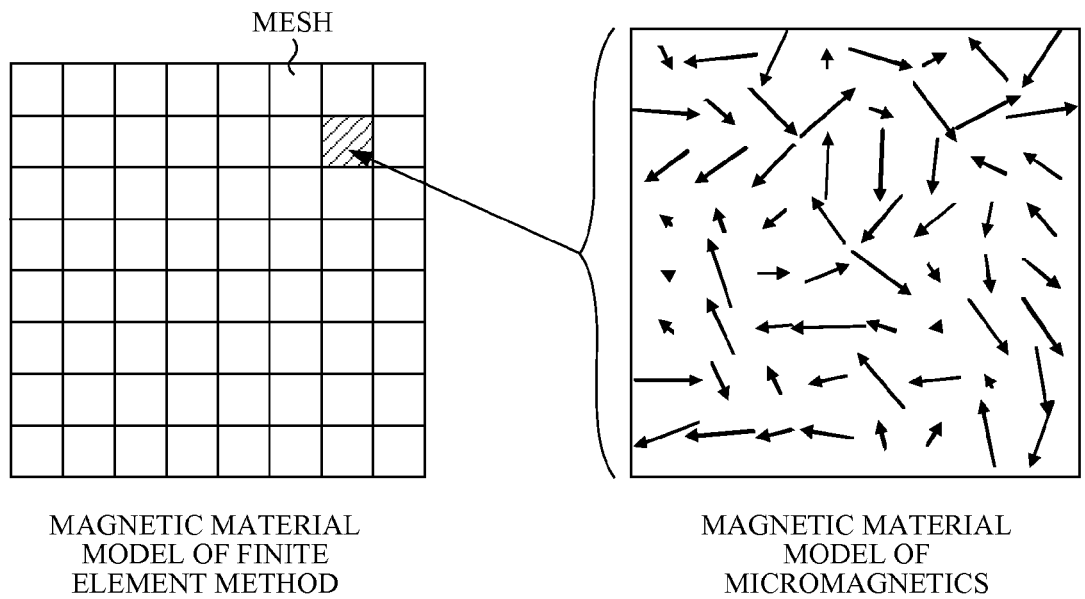
FIG. 7 is a diagram illustrating a relationship between a magnetic material model of the micromagnetics and meshes included in the magnetic material model of a finite element method.

FIG. 7 is a diagram illustrating a relationship between the magnetic material model of the micromagnetics and meshes included in the magnetic material model of the finite element method.

As illustrated in FIG. 7, the magnetic material model of the micromagnetics is prepared one by one for each mesh included in the magnetic material model of the finite element method. FIG. 7 illustrates the magnetic material model of the micromagnetics corresponding to a single mesh of the finite element method, and only the same number of magnetic material models as the number of meshes included in the magnetic material model of the finite element method is required. Here, the magnetic material model of the micromagnetics is a magnetic material model of the soft magnetic material such as the electrical steel. The magnetic material model of the finite element method is a magnetic material model generally used by engineering calculation, and a magnetic material thereof is not limited. The soft magnetic material is material with a small coercivity, and it is used for the electrical steel, a core such as a coil and a transformer, a magnetic yoke, a magnetic shield, or the like. The coercivity of the soft magnetic material is 0.1 to 100 A/m. On the contrary, the hard magnetic material is material with a large coercivity, and is used as a permanent magnet or a magnetic material for magnetic record. The coercivity of the hard magnetic material is more than or equal to 1000 A/m.

Figure 8:
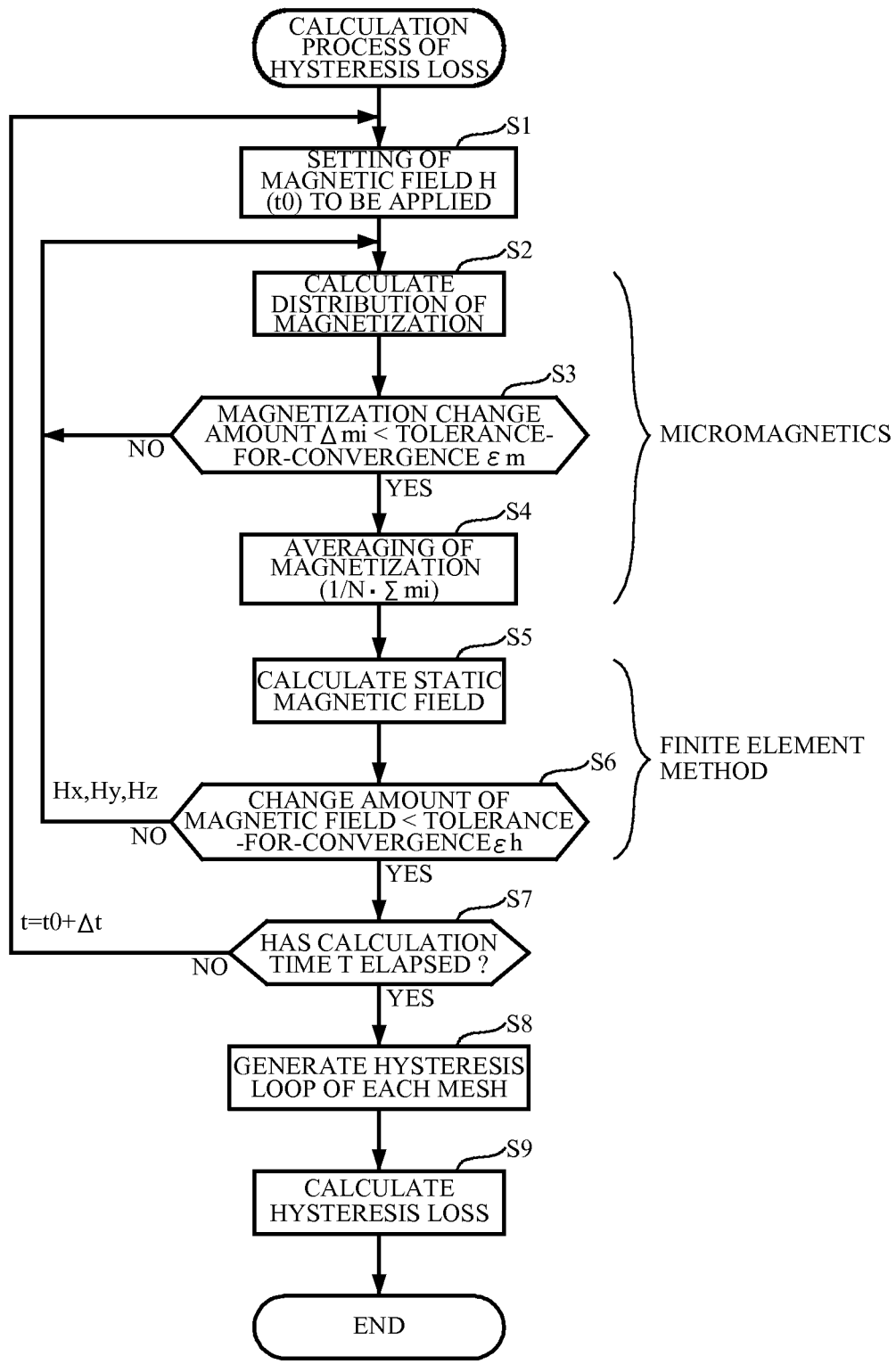
FIG. 8 is a flowchart illustrating a calculation process of a hysteresis loss which the simulation program performs.

FIG. 8 is a flowchart illustrating the calculation process of the hysteresis loss which the simulation program performs.

First, the simulation program applies the external magnetic field $H(t_0)$ in $t=t_0$ second to the magnetic material model of the micromagnetics (step S1). Next, the simulation program calculates the distribution of magnetization by the external magnetic field $H(t_0)$ in $t=t_0$ second, based on the micromagnetics (specifically, the equations 10 and 13) (step S2). The calculation of step S2 is performed to each mesh included in the magnetic material model of the finite element method.

The simulation program continues convergence calculation until magnetization change amounts $\Delta m_{ix}$, $\Delta m_{iy}$, and $\Delta m_{iz}$ of magnetization $m_{ix}$, $m_{iy}$, and $m_{iz}$ which are x, y and z components of calculated magnetization $m_i$ become smaller than a predetermined tolerance-for-convergence $e_m$ (a loop of NO in step S3 and step S2). When the magnetization change amounts $\Delta m_{ix}$, $\Delta m_{iy}$ and $\Delta m_{iz}$ become smaller than the predetermined tolerance-for-convergence $\epsilon_m$ (YES in step S3), the simulation program calculates $1/N \cdot \Sigma m_{ix}$, $1/N \cdot \Sigma m_{iy}$, and $1/N \cdot \Sigma m_{iz}$ by averaging respective $m_{ix}$, $m_{iy}$, and $m_{iz}$ with the number of meshes included in the magnetic material model of the micromagnetics, and transfers these values to a calculation loop of the finite element method (step S4). That is, the simulation program calculates average values of the magnetization by dividing the total value of the magnetization by the number of meshes included in the magnetic material model of the micromagnetics, and transfers the average values of the magnetization to the calculation loop of the finite element method.

The simulation program gives the averaged values $1/N \cdot \Sigma m_{ix}$, $1/N \cdot \Sigma m_{iy}$, and $1/N \cdot \Sigma m_{iz}$ of the magnetization to each mesh, and calculates the static magnetic field with the equation (14) in the finite element method (step S5). Specifically, the simulation program calculates values of the magnetic field $H_x$, $H_y$ and $H_z$ in each mesh.

The simulation program judges whether change amounts of the magnetic field $\Delta H_x$, $\Delta H_y$ and $\Delta H_z$ from the magnetic field $H_x$, $H_y$ and $H_z$ in a previous convergence loop are less than a given tolerance-for-convergence $\epsilon_h$ (step S6). When the change amounts of the magnetic field $\Delta H_x$, $\Delta H_y$ and $\Delta H_z$ are more than or equal to the given tolerance-for-convergence $\epsilon_h$ (NO of step S6), the simulation program transfers the magnetic field $H_x$, $H_y$ and $H_z$ of each mesh to a calculation loop of the micromagnetics, and continues convergence calculation of steps S2 and S3. When the change amounts of the magnetic field $\Delta H_x$, $\Delta H_y$ and $\Delta H_z$ are less than the given tolerance-for-convergence $\epsilon_h$ (YES of step S6), the simulation program judges whether a calculation time T has elapsed (step S7). The calculation time T corresponds to one cycle or several cycles of the external applied magnetic field. When the calculation time T has not elapsed (NO of step S7), the simulation program sets forward time $t=t_0$ to time $t=t_0+\Delta t$ seconds, and repeatedly performs the process of steps S1 to S7.

Figure 9:
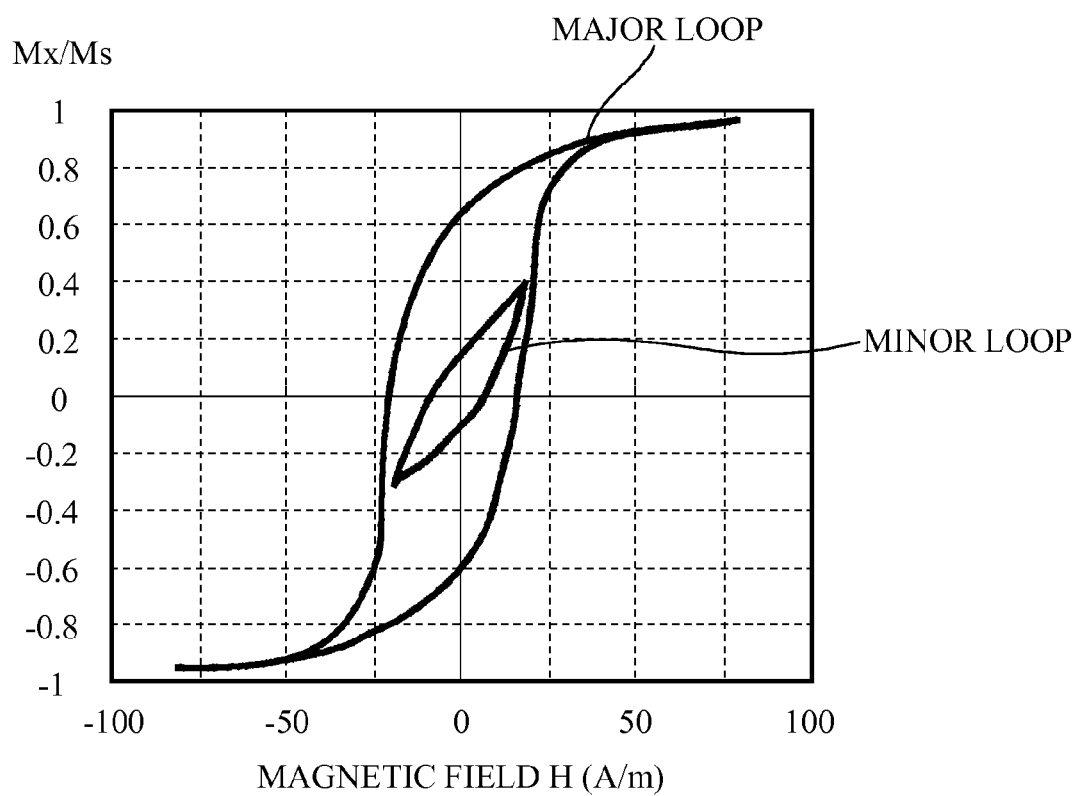
FIG. 9 is a diagram illustrating an example of the hysteresis loop which the simulation program generates.

When the calculation time T has elapsed (YES of step S7), the simulation program generates the hysteresis loop of each mesh included in the magnetic material model of the finite element method (step S8). Here, the simulation program generates the hysteresis loop by using the average values $M_x=1/N \cdot \Sigma m_{ix}$, $M_y=1/N \cdot \Sigma m_{iy}$, and $M_z=1/N \cdot \Sigma m_{iz}$ of the magnetization calculated by the micromagnetics and the magnetic field $H_x$, $H_y$ and $H_z$ calculated by the finite element method. FIG. 9 is a diagram illustrating an example of the hysteresis loop which the simulation program generates. In FIG. 9, not only the major loop but also the minor loop is generated. Here, the simulation program generates the hysteresis loops similar to FIG. 9 for the average values $M_y$ and $M_z$ of the magnetization.

The simulation program calculates an area of the hysteresis loop in each mesh included in the magnetic material model of the finite element method, with a following equation (15), and calculates the hysteresis loss of all the magnetic material model of the finite element method by adding all the calculation results (step S9).

$$W_h = \oint H dM \qquad (15)$$

Although in the present embodiment, the simulation program applies the magnetic material model of the micromagnetics to each mesh included in the magnetic material model of the finite element method, calculation efficiency can be improved by applying the same magnetic material model of the micromagnetics to all meshes or a plurality of meshes included in the magnetic material model of the finite element method.

The simulation program can also take in magnetic energy by stress (energy by magnetoelastic effect) or thermal energy as energy to be taken into consideration when calculating magnetization distribution of the magnetic material model.

According to the first embodiment, the simulation program makes the calculation method of the micromagnetics that calculates the average magnetization of the magnetic material model of the micromagnetics and the calculation method of the finite element method that calculates the static magnetic field of the magnetic material model of the finite element method in which the magnetic material model of the micromagnetics is assigned to each mesh cooperate. Then, the simulation program generates the hysteresis loop of each mesh included in the magnetic material model of the finite element method based on the calculated average magnetization and the calculated static magnetic field, and calculates the hysteresis loss of the magnetic material model of the finite element method from the area of the generated hysteresis loop. Therefore, the calculation amount is largely reduced, compared with a case of calculating the hysteresis loop using only the calculation method of the micromagnetics. Moreover, it is possible to accurately measure the static magnetic field, and to accurately calculate the hysteresis loss in the magnetic material included in the electric equipment by simulation.

According to the first embodiment, since the value of the magnetostatic field factor $h_m$ is included in the range of 0 to 1.25, the major loop and the minor loop of each mesh included in the magnetic material model of the finite element method can be reproduced by simulation.

In addition, according to the first embodiment, the simulation program can accurately calculate the hysteresis loss of the soft magnetic material such as the electrical steel included in the electric equipment, by making the magnetic material model of the micromagnetics and the static magnetic field calculation by the finite element method cooperate.

Embodiment 2

Although in the above-mentioned first embodiment, the simulation program calculates the hysteresis loss, the simulation program calculates the abnormal eddy current loss in the second embodiment.

Generally, the abnormal eddy current loss $W_e$ by the magnetic domain wall motion is expressed by the following equation (16).

$$W_e = 2HI_s vd \tag{16}$$

Wherein "H" represents the magnetic field applied to the magnetic material, "$I_s$" represents the saturation magnetic flux density, "v" represents the velocity of the magnetic domain wall motion, and "d" represents the film thickness of the magnetic material. As is clear from the equation (16), if the velocity "v" of the magnetic domain wall motion is obtained, the abnormal eddy current loss can be calculated.

Figure 10A:
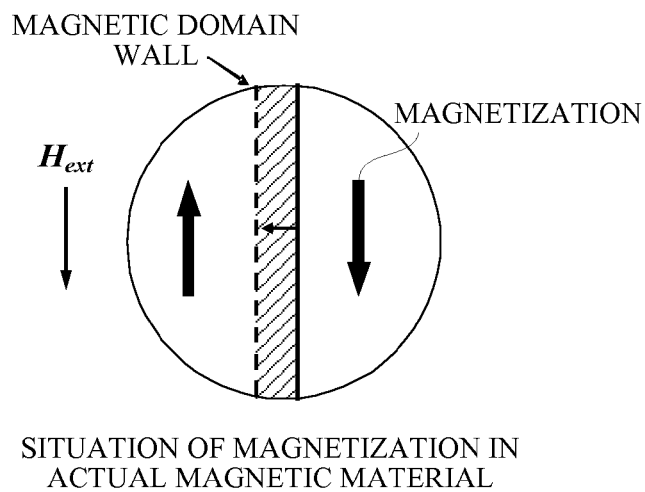
FIG. 10A is a diagram illustrating a situation of the magnetization in an actual magnetic material.
Figure 10B:
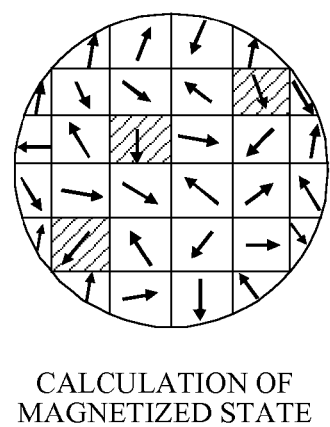
FIG. 10B is a diagram illustrating a magnetic material model of the micromagnetics expressing magnetic domain wall motion.

FIG. 10A is a diagram illustrating a situation of the magnetization in an actual magnetic material. FIG. 10B is a diagram illustrating the magnetic material model of the micromagnetics expressing the magnetic domain wall motion. In the actual magnetic material (e.g. an electrical steel), the magnetic domain walls exist in the magnetic material as illustrated in FIG. 10A. The magnetic domain walls move by the external magnetic field $H_{ext}$, so that the abnormal eddy current loss occurs. A shaded area in FIG. 10A illustrates the magnetic domain wall motion. Since the magnetic material model of the micromagnetics of the present embodiment does not deal with the magnetic domain walls strictly, the simulation program cannot calculate the magnetic domain wall motion itself. Therefore, the simulation program observes the magnetization of each mesh included in the magnetic material model of the micromagnetics, as illustrated in FIG. 10B, and pays attention to a change amount of the magnetization from a preceding time t-$\Delta$t in a certain time t. This is because the magnetization changes by the magnetic domain wall motion. Each of shaded areas in FIG. 10B illustrates a mesh which has caused the magnetization reversal.

Figure 11:
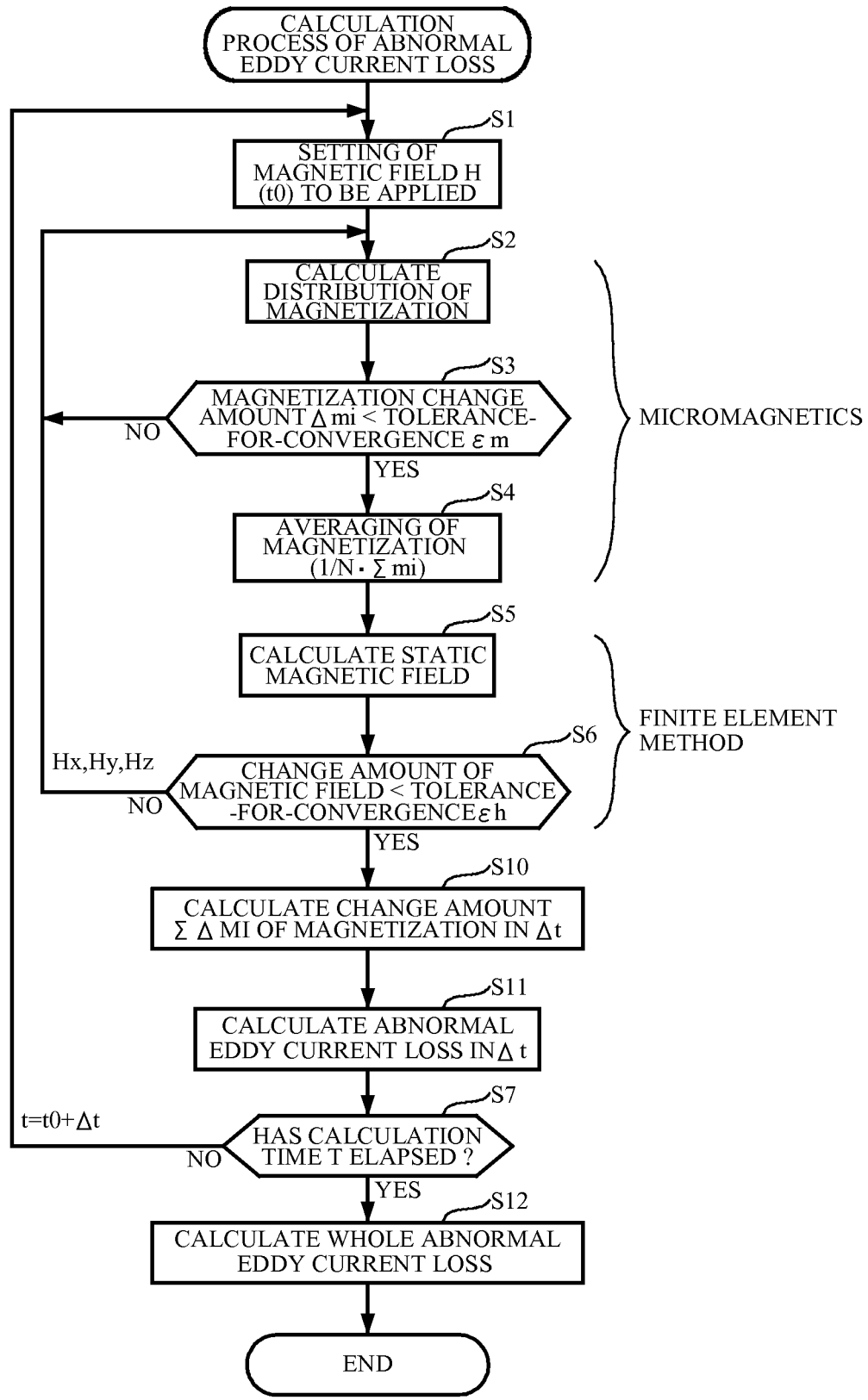
FIG. 11 is a flowchart illustrating a calculation process of an abnormal eddy current loss which the simulation program performs.

Next, a description will be given of the calculation method of the abnormal eddy current loss. FIG. 11 is a flowchart illustrating a calculation process of the abnormal eddy current loss which the simulation program performs. Steps similar to those in FIG. 8 are designated by identical step numbers, and description thereof is omitted.

When the change amounts of the magnetic field $\Delta H_x$, $\Delta H_y$ and $\Delta H_z$ are less than the given tolerance-for-convergence $\epsilon_h$ (YES of step S6), the simulation program extracts a mesh which has caused the magnetization reversal to the direction of the external magnetic field during the $\Delta$t, and calculates the change amount $\Sigma \Delta m_i$ of the magnetization in the $\Delta$t by adding the change amount $\Delta m_i$ of magnetization of the magnetization-reversed mesh (step S10). The simulation program can calculate a value corresponding to "$I_s vd$" of the equation (16) from multiplication of the change amount $\Sigma \Delta m_i$ of the magnetization and a volume of the domain which has caused the magnetization reversal. Thus, the simulation program calculates the abnormal eddy current loss in the $\Delta$t from multiplication of 2, the external magnetic field, the change amount $\Sigma \Delta m_i$ of the magnetization and a volume of the domain which has caused the magnetization reversal (step S11).

Then, when the calculation time T has elapsed (YES of step S7), the simulation program calculates the whole abnormal eddy current loss by adding all the abnormal eddy current losses until the calculation time T elapses (step S12).

In an actual motor, the external magnetic field to be applied is not a fixed direction and changes momentarily. However, also in such a case, the simulation program can calculate the abnormal eddy current loss from the amount of the magnetization reversal during the $\Delta$t.

According to the present embodiment, the simulation program extracts, during a time period from applying the external magnetic field to the magnetic material model of the micromagnetics to convergence of the change of the magnetization and the static magnetic field, a mesh which has caused the magnetization reversal from the magnetic material model of the micromagnetics and calculates the change amount of the magnetization included in the extracted mesh. Then, the simulation program calculates the abnormal eddy current loss of the magnetic material model of the micromagnetics based on the calculated change amount of the magnetization, the volume of the mesh which has caused the magnetization reversal, and the external magnetic field. Therefore, it is possible to accurately calculate the abnormal eddy current loss in the magnetic material included in the electric equipment by simulation.

A non-transitory computer-readable recording medium on which the simulation program is recorded may be supplied to the CPU 11, and the CPU 11 may read and execute the simulation program recorded on the recording medium. In this manner, the same effects as those of the above-described first and the above-described second embodiments can be achieved. The non-transitory computer-readable recording medium for providing the simulation program may be a CD-ROM (Compact Disk Read Only Memory), a DVD (Digital Versatile Disk), or a SD (Secure Digital) memory card, for example.

What is claimed is:

1. A method for simulating a magnetic material performed by a computer, comprising:

repeatedly performing by a processor a first process and a second process until the change of magnetization and a static magnetic field converges, the first process being to calculate a distribution of the magnetization and an average magnetization in a magnetic material model of micromagnetics, and the second process being to assign the magnetic material model of the micromagnetics to each mesh included in another magnetic material model, calculate the static magnetic field of the another magnetic material model using the average magnetization calculated by the first process, and return the calculated static magnetic field to the calculation of the distribution of the magnetization;

generating by the processor a hysteresis loop of each mesh included in the another magnetic material model based on the average magnetization calculated by the first process and the static magnetic field calculated by the second process;

calculating by the processor a hysteresis loss of the another magnetic material model from an area of the generated hysteresis loop;

extracting, during a time period from applying an external magnetic field to the magnetic material model of the micromagnetics to convergence of the change of the magnetization and the static magnetic field, a mesh which has caused magnetization reversal from the magnetic material model of the micromagnetics;

calculating a change amount of the magnetization included in the extracted mesh; and calculating an abnormal eddy current loss of the magnetic material model of the micromagnetics based on the calculated change amount of the magnetization, a volume of the mesh which has caused the magnetization reversal, and the external magnetic field.

2. The method for simulating the magnetic material as claimed in claim 1, wherein the computer applies an external magnetic field to the magnetic material model of the micromagnetics, calculates the distribution of magnetizations in a plurality of first meshes included in the magnetic material model of the micromagnetics using equations (i) and (ii), calculates the average magnetization by dividing a total value of the magnetizations by the number of first meshes included in the magnetic material model of the micromagnetics, and calculates the static magnetic field using the average magnetization calculated by the first process and an equation (iii), $$h_i = \frac{H_i}{H_k} = (k_i \cdot m_i)k_i + h_m \sum_{j=1}^{N} D_{ij} \cdot m_j + h_e \sum_{n,n} m_j + h_a \qquad (i)$$

$$\frac{dm_i}{dt} = m_i \times h_i - \alpha m_i \times (m_i \times h_i), i = 1, 2, \ldots, N \qquad (ii)$$

$$rot(vrotA) = J_0 - \sigma \frac{\partial A}{\partial t} - \sigma grad\phi, \qquad (iii)$$

wherein "$H_i$" represents an effective magnetic field, "$H_k$" represents a magnetic anisotropy, "$k_i$" represents a unit vector in an axis direction of easy magnetization, each of "$m_i$" and "$m_j$" represents a unit vector in a direction of magnetization, "$D_{ij}$" represents a demagnetizing factor determined from a geometric shape of a mesh, "$h_m$" represents a magnetostatic field factor standardized by the magnetic anisotropy $H_k$ ($h_m=M/H_k$), "M" represents saturation magnetization of each mesh, "$h_e$" represents an exchange interaction factor standardized by the magnetic anisotropy $H_k$ ($h_e=A*/Ka^2$), "K" represents a magnetic anisotropy factor, "A*" represents a stiffness constant, "a" represents a distance between meshes, "$h_a$" represents an externally-applied magnetic field ($H_{app}/H_k$) standardized by the magnetic anisotropy $H_k$, "A" represents a magnetic vector potential, "$J_0$" represents a current, "σ" represents an electric conductivity, and "ϕ" represents a scalar potential.

3. The method for simulating the magnetic material as claimed in claim 2, wherein a value of the magnetostatic field factor $h_m$ in the equation (i) is included in a range of 0 to 1.25.

4. The method for simulating the magnetic material as claimed in claim 2, wherein the magnetic anisotropy $H_k$ has any one of a two-dimensional random distribution or a three-dimensional random distribution.

5. The method for simulating the magnetic material as claimed in claim 2, wherein the distribution of the magnetic anisotropy $H_k$ has anisotropy in an arbitrary direction.

6. The method for simulating the magnetic material as claimed in claim 1, wherein when the distribution of a plurality of magnetizations in a plurality of first meshes included in the magnetic material model of the micromagnetics is calculated in the first process, energy by a magnetoelastic effect or thermal energy is taken in to the calculation of the distribution.

7. A non-transitory computer readable recording medium having stored therein a program for causing a computer to execute a process, the process comprising:

repeatedly performing by a processor a first process and a second process until the change of magnetization and a static magnetic field converges, the first process being to calculate a distribution of the magnetization and an average magnetization in a magnetic material model of micromagnetics, and the second process being to assign the magnetic material model of the micromagnetics to each mesh included in another magnetic material model, calculate the static magnetic field of the another magnetic material model using the average magnetization calculated by the first process, and return the calculated static magnetic field to the calculation of the distribution of the magnetization;

generating by the processor a hysteresis loop of each mesh included in the another magnetic material model based on the average magnetization calculated by the first process and the static magnetic field calculated by the second process;

calculating by the processor a hysteresis loss of the another magnetic material model from an area of the generated hysteresis loop;

extracting, during a time period from applying an external magnetic field to the magnetic material model of the micromagnetics to convergence of the change of the magnetization and the static magnetic field, a mesh which has caused magnetization reversal from the magnetic material model of the micromagnetics;

calculating a change amount of the magnetization included in the extracted mesh; and calculating an abnormal eddy current loss of the magnetic material model of the micromagnetics based on the calculated change amount of the magnetization, a volume of the mesh which has caused the magnetization reversal, and the external magnetic field.

8. The non-transitory computer readable recording medium as claimed in claim 7, wherein when the distribution of a plurality of magnetizations in a plurality of first meshes included in the magnetic material model of the micromagnetics is calculated in the first process, energy by a magnetoelastic effect or thermal energy is taken in to the calculation of the distribution.

* * * * *